(12) United States Patent
Maha

(10) Patent No.: US 11,876,815 B2
(45) Date of Patent: Jan. 16, 2024

(54) DEVICE ANOMALY DETECTION

(71) Applicant: McAfee, LLC, Santa Clara, CA (US)

(72) Inventor: Davoud Maha, Danville, CA (US)

(73) Assignee: McAfee, LLC, San Jose, CA (US)

(*) Notice: Subject to any disclaimer, the term of this patent is extended or adjusted under 35 U.S.C. 154(b) by 340 days.

(21) Appl. No.: 16/809,423

(22) Filed: Mar. 4, 2020

(65) Prior Publication Data

US 2021/0281590 A1    Sep. 9, 2021

(51) Int. Cl.
*H04L 9/00*    (2022.01)
*H04L 9/40*    (2022.01)
*H04L 43/0876*    (2022.01)

(52) U.S. Cl.
CPC ...... *H04L 63/1425* (2013.01); *H04L 43/0876* (2013.01); *H04L 63/1416* (2013.01); *H04L 63/1433* (2013.01)

(58) Field of Classification Search
CPC ............. H04L 63/1425; H04L 63/1416; H04L 63/1433
USPC .......................................................... 726/26
See application file for complete search history.

(56) References Cited

U.S. PATENT DOCUMENTS

| | | | |
|---|---|---|---|
| 6,651,034 B1* | 11/2003 | Hedlund | B60L 3/12 |
| | | | 702/183 |
| 11,269,750 B2* | 3/2022 | Boyapalle | G06F 11/3055 |
| 2010/0191503 A1* | 7/2010 | Pecht | G06F 11/008 |
| | | | 702/179 |
| 2014/0108652 A1* | 4/2014 | Richard | H04L 43/16 |
| | | | 709/224 |
| 2016/0292026 A1* | 10/2016 | Mullarkey | G06F 11/0754 |
| 2018/0189292 A1* | 7/2018 | Grace, Jr. | G06F 16/24578 |
| 2019/0052551 A1* | 2/2019 | Barczynski | H04L 41/5009 |
| 2019/0354680 A1* | 11/2019 | De Lima Junior | G06F 21/566 |
| 2020/0067935 A1* | 2/2020 | Carnes, III | H04L 63/101 |
| 2021/0209486 A1* | 7/2021 | Fan | G06N 5/04 |

* cited by examiner

*Primary Examiner* — Christopher J Brown
(74) *Attorney, Agent, or Firm* — Patent Capital Group

(57) ABSTRACT

There is disclosed in one example a computing apparatus, including: a hardware platform including a processor and a memory; and an anomaly detection engine including instructions encoded within the memory to instruct the processor to: periodically collect telemetry for a performance parameter; compute and maintain a local trend line for the performance parameter; receive from a cloud service a global trend line for the performance parameter for a class of devices including the computing apparatus; and perform anomaly detection including analyzing the local trend line and the global trend line to detect an anomaly.

20 Claims, 11 Drawing Sheets

DEVICE ANOMALY DETECTION

FIELD OF THE SPECIFICATION

This application relates in general to computer security, and more particularly, though not exclusively, to a system and method for providing device anomaly detection.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
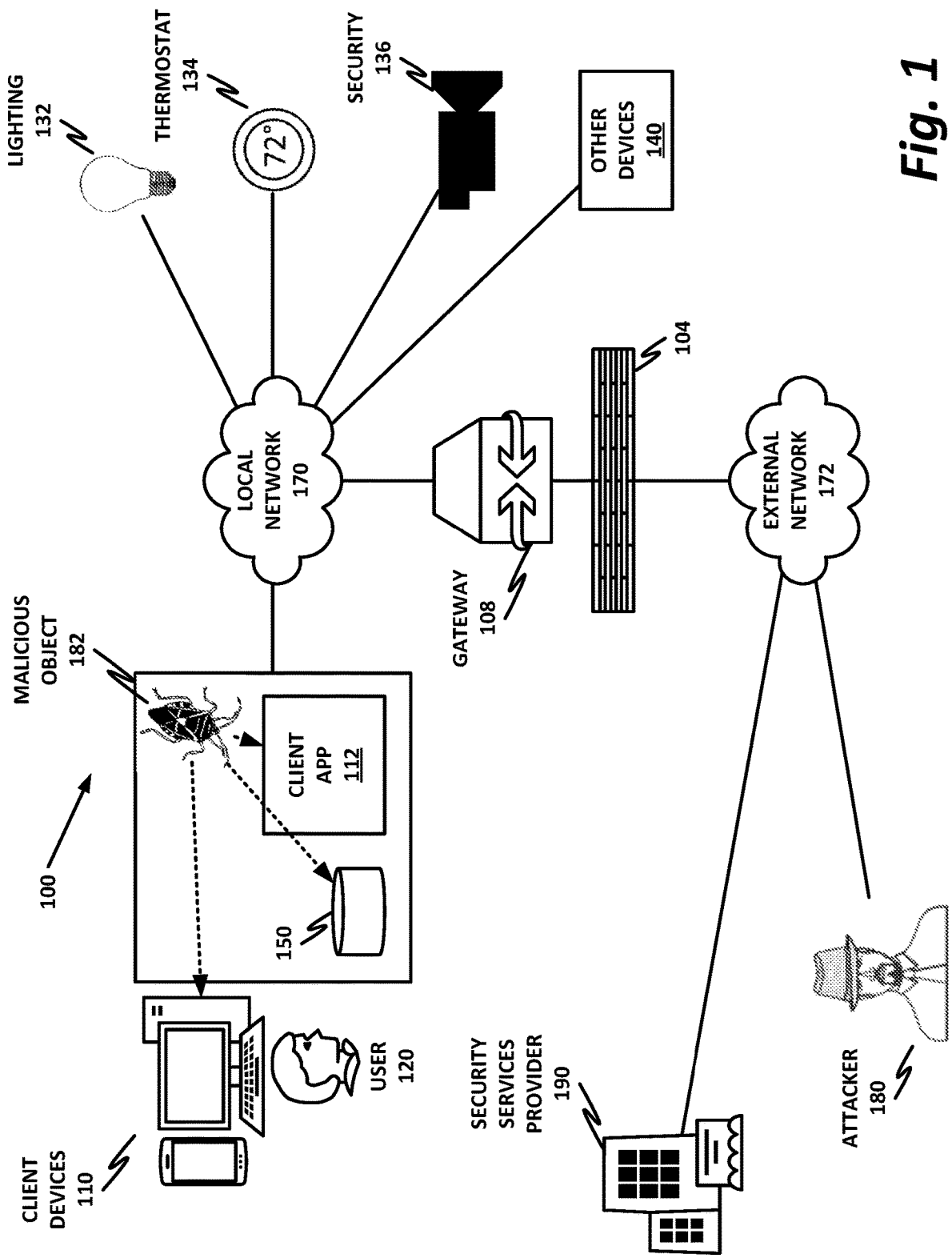
FIG. 1 is a block diagram illustrating selected elements of a security ecosystem.

In an example, there is disclosed a computing apparatus, comprising: a hardware platform comprising a processor and a memory; and an anomaly detection engine comprising instructions encoded within the memory to instruct the processor to: periodically collect telemetry for a performance parameter; compute and maintain a local trend line for the performance parameter; receive from a cloud service a global trend line for the performance parameter for a class of devices including the computing apparatus; and perform anomaly detection comprising analyzing the local trend line and the global trend line to detect an anomaly.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

In a landscape of ever-evolving threats, device and application security require evolving and responsive solutions. This is true both for mobile computing devices, and for traditional devices such as laptop and desktop computers. Threats to these devices include not only malicious software (e.g., viruses, Trojans, cracks, and similar), but also spyware, adware, personal data collection, or even poorly designed applications that consume excessive resources.

Some contemporary devices use so-called "app stores" that are managed by a central authority, such as Apple for the iOS app store, Google for the standard Android app store, Microsoft for Microsoft Windows app stores, and other authorities for some smaller app stores. These central authorities may have standards for testing and verifying applications that are uploaded to their app stores, including identifying malicious software or software that misbehaves.

But malicious and/or poor behavior may not always be detectable by initial testing. It is possible for an application to misbehave in a way that is either deliberately or inadvertently difficult to detect. For example, the application may wait to "phone home" until after an initial period designed to defeat initial app store testing. It could also wait for an activation signal from an outside source, or the application could be poorly developed or misconfigured in such a way that it will misbehave only under certain circumstances, or with certain combinations of operating system, processor, peripherals, software installations, or similar.

Thus, an application could be silent or well-behaved for days, weeks, or even months before it starts misbehaving. This intermittent or unpredictable misbehavior can be difficult to screen for in the first instance, and it may be difficult to identify using traditional antivirus or anti-malware means. Thus, it is possible for misbehavior to go undetected, either permanently, or for some time.

Detection of anomalous behavior may include detecting an impact on a device that is out-of-bounds of the device's normal resource "footprint." This could include, by way of illustrative and nonlimiting example, unusual memory usage, unusual central processor unit (CPU) usage, unusual battery usage, unusual network usage, access to unusual resources or peripherals, or other unusual or unexpected circumstances.

For example, a mobile or other device could have installed thereon a security agent, or other local device agent. This security agent could include a telemetry collection engine that may wake up at various intervals (e.g., every few minutes, such as every 5 to 10 minutes), and take a snapshot of overall resource or system usage. This can include snapshotting the CPU, memory, network, peripherals, applications, or other resources. The telemetry data collected in these snapshots could be uniform across all devices, or it could be influenced by a number of classes to which the device is assigned. As described in more detail below, these classes may be assigned by a cloud service that includes a multi-label classifier engine, such as a neural network. This neural network can analyze data from a large set of classes, and identify commonalities and trends. These commonalities and trends can then be used to assign a device to a number of classes, and to assign a number of telemetry data of interest that are applicable to those classes.

As the device collects telemetry for these various classes, it may maintain snapshots of these data in a local telemetry cache. It may also optionally upload data to a global cloud service, which can use the uploaded data to train and operate a neural network that provides the classifications and data mining. Optionally, these uploaded data may be anonymized before they are sent, to preserve user privacy.

As described above, this telemetry data (which may also include the device's make and model) may be collected periodically, such as every 5 to 10 minutes. When the data are collected, they may be uploaded to the server at each collection, or they may be uploaded later in batches. Data collection may be kept lightweight to help ensure that excessive network bandwidth is not consumed by the device's security agent in uploading the data.

On the server side, data uploaded by the device are aggregated with data collected and uploaded by many other devices in the security ecosystem. For example, MCAFEE, LLC provides the McAfee Mobile Security Suite (MMS), which includes such a user agent. MMS could be configured on a number of devices, including both iPhone and Android devices. Data from millions of devices may be uploaded to a cloud service and stored in a global anonymized device database.

A machine learning system, such as a neural network, may then operate on the large data set to perform data mining. This can provide multi-label or multi-nominal classifications that can be applied to devices. For example, a very straightforward classification would be any device of the same make, model, operating system, operating system version, and hardware configuration. For example, it is logical to class iPhone 10 devices running iOS 13.1 with the same processor and hardware configuration together, and to apply trendlines to that class of devices. However, the machine learning algorithm could also provide other trendlines, including variations based on user options or configurations, installed applications, variations in hardware configuration, variations in software configuration or OS version, or similar. There could also be trendlines for different devices that have the same CPU or a common hardware element, even though they are from different makes and models.

An advantage of using a machine learning classifier is that classifications need not be manually configured at the outset. Rather, the neural network itself can identify commonalities, and define classes for various devices or configurations. An individual device may be assigned to one or more such classes, with an optional weighting that indicates how strongly the device is associated with that class.

The cloud service may compile aggregated trendlines for each class, along with one or more device usage parameters that are of interest to that class. For example, taking the basic class of identical devices with identical operating system, trendlines may be computed for CPU usage, memory usage, battery usage, and network usage. These can be computed globally as an average for all devices belonging to that class. Periodically, such as once a day or at some other interval, the cloud service may push to endpoints of that class the current aggregate trendline for each resource for that class.

On the device side, the user endpoint may receive assignment to one or more classes, along with one or more trendlines for one or more resources associated with each class. The local device may also keep its own trendlines for its usage of class resources.

Over time, the endpoint may compare its resource usage to the global baseline over time. It is not necessarily a concern if the local usage is above or below the global baseline trend. For example, for the classifier iPhone 10 running iOS 13.1, one user may use the device heavily for games, while another user may use the device primarily for talking on the phone, sending texts, and reading e-mail. These users will have vastly different trendlines for CPU, memory, network, and battery usage. However, over time, a security agent on each device can monitor how the individual trendline compares to the global baseline.

The agent may monitor specifically for so-called "anomaly events." An anomaly event may include an event where the user's own trendline deviates substantially from normal, where the baseline deviates substantially from normal, or where the user's trendline relative to the baseline deviates substantially from normal. For example, a misconfigured OS update could cause both the user's trendline and the global trendline to see a spike in battery usage. In this case, the user's trendline relative to the global trendline may remain relatively constant, but because both deviate from normal (e.g., more than x standard deviations from the mean), an anomaly may be detected. In another case, the global trendline may deviate more than x standard deviations from the mean, but the user's trendline may remain relatively constant. This may indicate an OS update or other issue that affects most users, but that for some reason has not immediately affected this user. Nevertheless, the anomaly event may still be of interest to the user.

In another case, the user may install an application or other software, or visit a website that is either malicious or misconfigured. In that case, the user may see a resource deviation that changes dramatically, even though the global baseline remains constant. For example, if the user installs a spyware application, the user may see spikes in the trendlines for both CPU usage and network usage. If these vary by more than x standard deviations from the user's mean usage, this may show up both as an absolute deviation from the local mean, and as a substantial deviation from the local trendline relative to the global trendline. Either one of these deviations may count as an anomaly, and both together may count even more strongly as an anomaly.

Once an anomaly is detected, appropriate action may be taken. For example, the user or an enterprise security administrator may be notified of the anomaly. This notification could include an indication of when the anomaly occurred, what resource or resources experienced the anomaly, the nature of the deviation (e.g., global, local, local with respect to global, or other), and other useful information. In some cases, the user could be presented with a visible graph of both the local and global trendlines, with a marker indicating where the anomaly occurred. Furthermore, at least in the case of Android operating systems, the device may be able to infer what event caused the anomaly. For example, if the anomaly followed the installation or first launch of a particular application, then the security agent may infer that this application caused the anomaly. Similarly, if the anomaly followed visiting a particular website, then it may be inferred that the website is the source of the anomaly. In the case of iOS, applications and activities are sandboxed, and it is therefore more difficult to provide an inferred source of the anomaly. However, even in these cases, the user can at least be provided with the time of the anomaly, so that he or she can then backtrack and examine their usage of the device at that time to try to individually infer what caused the anomaly.

In some embodiments, it is possible that the device could be assigned to an excessive number of classes. In that case, tracking and calculating anomalies for each individual class could itself become burdensome. To mitigate this burden, various techniques may be used. For example, local trendlines and deviations may not be computed every time a telemetry packet is collected. Rather, these could be computed at less frequent intervals, such as once a day, and optionally, when the device is experiencing low end user usage.

Furthermore, the burden on the device can be reduced by limiting the number of classes tracked locally. For example, the machine learning classifier in the cloud could identify a large number of classes, such as 100, that the device could be assigned to. However, it may not be practical to track all 100 classes on the local device. In that case, the device or the cloud service may select the n most important classes (e.g., 5, 6, 10, or some other number of most important classes). The importance of classes could be based on, for example, the strength of the match, or an identified importance of a class, or the importance of resources assigned to the class. Based on this determination, the local endpoint may track only the n most important classes, and perform trendline analysis on those classes.

In some cases, the cloud service may also provide alerts. For example, if a global anomaly is detected, such as an OS update that causes anomalous resource usage across a large number of devices, a push notification could be provided to the endpoints to warn them of the anomaly and its potential implications. Furthermore, although the number of classes tracked on the endpoint may be limited, if sufficient compute resources are available on the cloud side, the cloud may compute trendlines for nonselected classes. Note, however, that this could also become burdensome on the cloud infrastructure. While the cloud infrastructure is expected to have substantially more compute resources, it may also be tracking millions of devices against tens or hundreds of classes. Thus, the cloud may perform some sampling. For example, the cloud could compute trendlines and deviations for all classes for a select group of devices identified as important for various business or technical reasons. In another embodiment, the cloud service could randomly sample a subset of devices, and perform a one-time computation of all trendlines for all classes for that random sample of devices. This can help to detect anomalies that may be not be detected on the endpoint. If anomalies are detected, then push alerts may be provided to appropriate endpoints, or to enterprise or global security administrators, or other appropriate remedial action may be taken.

A system and method for providing device anomaly detection will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram illustrating a security ecosystem 100. In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. Client device 110 could be an endpoint device configured to practice the teachings of this specification, including a mobile device. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that features service function chaining (SFC) or network function virtualization (NFV), gateway 108 may be include one or more service functions and/or virtualized network functions.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as a cloud service such as the cloud service described herein, security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
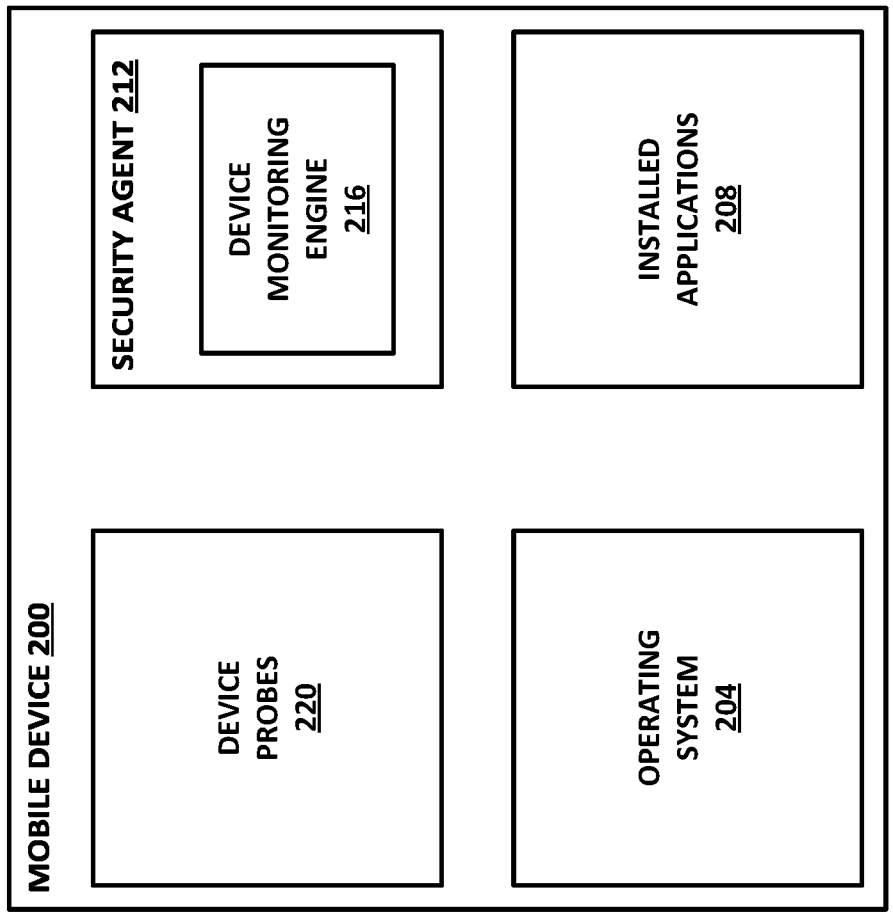
FIG. 2 is a block diagram of a computing device.

FIG. 2 is a block diagram of a computing device. In this specific illustration, the computing device is a mobile device 200. Although mobile device 200 is provided as an illustrative example to illustrate the teachings of this specification, it should be understood to be nonlimiting. The computing device 200 could also be a tablet computer, a laptop, a desktop, a server, or any other suitable computing device.

Figure 8:
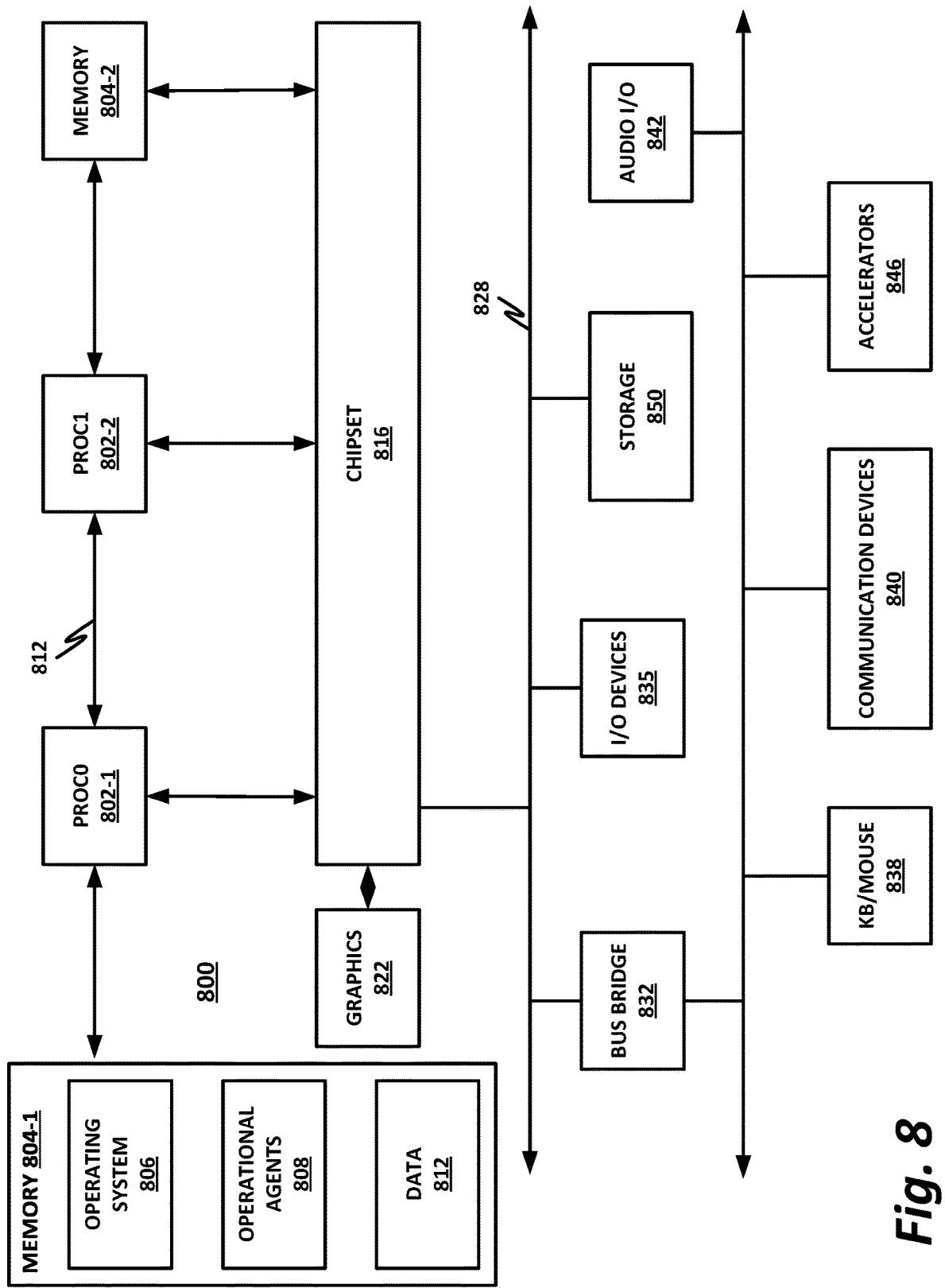
FIG. 8 is a block diagram illustrating selected elements of a hardware platform.

In this illustration, mobile device 200 may be provided on a hardware platform, such as, for example, hardware platform 800 of FIG. 8, or any of the other hardware platforms illustrated herein. Elements of mobile device 200 are illustrated herein as logical or functional blocks. These could be provided, for example, in software as operational agents, as illustrated with operational agents 808 of FIG. 8.

It should be noted that only selected functional elements of mobile device 200 are illustrated herein, to focus the discussion and to provide simplicity of the FIGURE. Not all logical blocks disclosed herein are required of every embodiment, and embodiments may include other logical blocks not disclosed herein, as appropriate.

In this illustration, an operating system 204 provides basic input and output services, and provides a platform for operating other software elements. In the case of mobile device 200, operating system 204 may popularly be either Android OS or Apple iOS. While these two operating systems together account for the vast majority of operating systems on mobile devices in the current computing ecosystem, these should also be treated as nonlimiting examples.

In the case of Android, Android is an "open" operating system, which means that a security agent 212 operating on mobile device 200 may have root level access to system resources. This enables security agent 212 to monitor other applications, and to gather detailed information about the device.

On the other hand, iOS is a closed operating system. This means that each application or software service may run in its own sandboxed environment, and processes may not have insight into, or control over, other processes. In that case, security agent 212 may be more limited in its ability to oversee processes. For example, in the specific case discussed above, for Android security agent 212 may be able to identify a specific software installation, software launch, website, or other event that correlates strongly with a detected anomaly. But for iOS, because security agent 212 is sandboxed, it may not have the same visibility into other processes.

Installed applications 208 may include various different kinds of applications that the user desires to operate on mobile device 200. Installed applications may come from an app store, may be "side loaded," or may be otherwise installed. In many cases, installed applications 208 may be the source of anomalous events, such as increased usage of processor, memory, network, storage, battery, or other system resources. This anomalous usage may be the result of malicious activity by an installed application, or may be the result of poor development. Among installed applications 208, there may be one or more web browsers, and web browsers and other web applications may represent yet another potential source of anomalous behavior.

Mobile device 200 includes a number of device probes 220, which may include hardware, software, and/or firmware elements that may be used to collect performance statistics and telemetry about mobile device 200. This could include sensors, self-reporting, interprocess communication, or other facilities.

Device monitoring engine 216 operates device probes 220 to collect telemetry data about mobile device 200. For example, in some cases, mobile device 200 may communicate with a cloud service and be assigned a class identifier for a device class that mobile device 200 belongs to.

Figure 3:
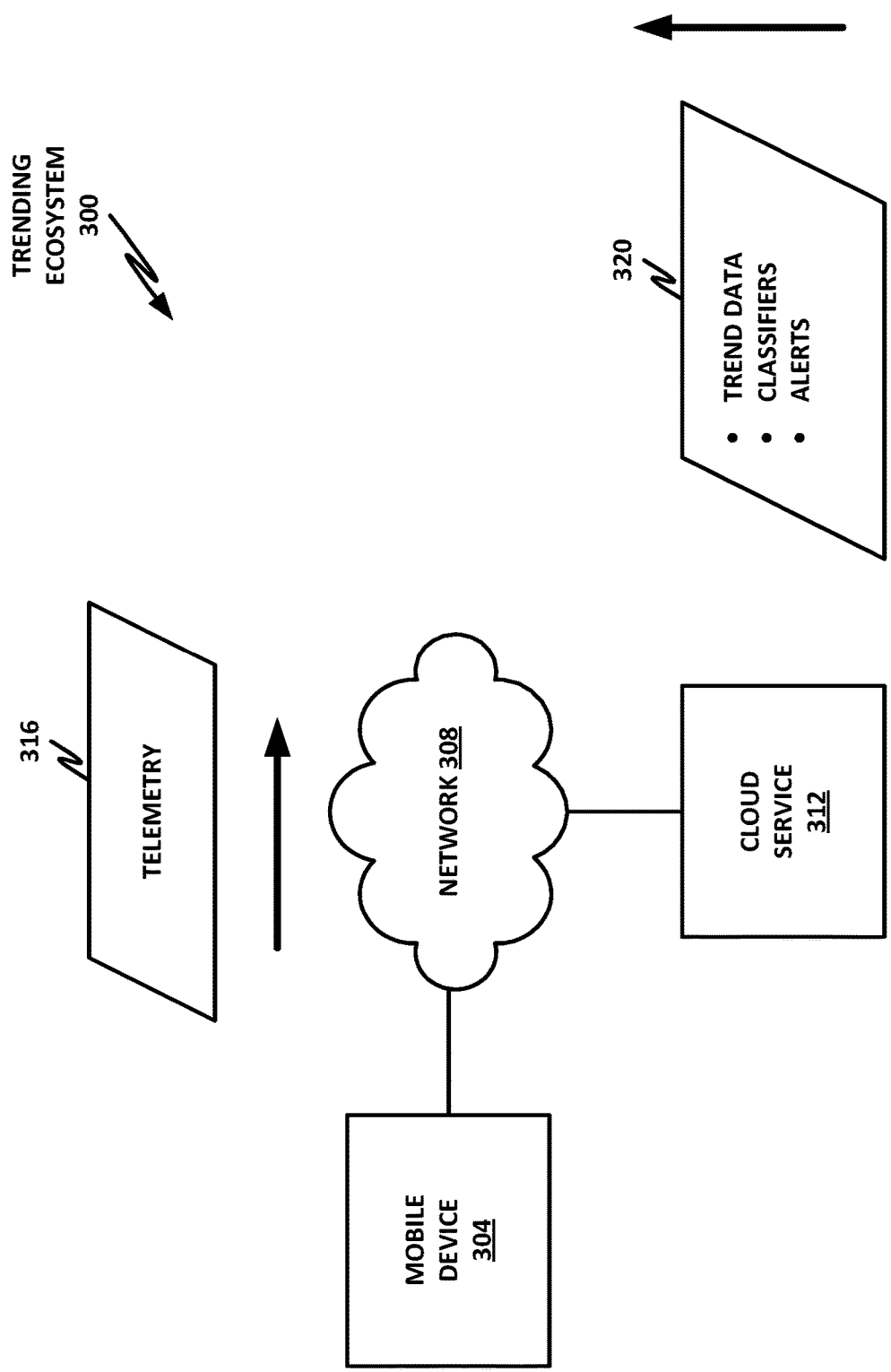
FIG. 3 illustrates a trending ecosystem.

Turning to FIG. 3, a trending ecosystem 300 is illustrated. In trending ecosystem 300, a mobile device 304 connects via network 308 to a cloud service 312. Mobile device 304 may be an example of mobile device 200 of FIG. 2. Cloud service 312 may provide trend data, classifiers, and alerts 320 to mobile device 304 via network 308. Mobile device 304 can provide telemetry 316 to cloud service 312 via network 308.

Cloud service 312 may occasionally publish global trending data to mobile device 304, including aggregate trending data collected from a large number of devices. For example, millions of devices may provide telemetry 316. Telemetry 316 may be anonymized to protect user privacy.

When device monitoring engine 216 receives global trend data from cloud service 312, device monitoring engine 216 may compare its local trendline to the global trendline for each classifier. Note that a number of different classes may use the same overall local "footprint," in addition to some class-specific performance data. However, cloud service 312 may provide a different global trendline for each class. Thus, even if mobile device 200 has a single footprint trendline, that single footprint trendline may be compared to trendlines that are applicable to a plurality of classes.

Mobile device 304 may perform periodic anomaly detection. For example, once a day, mobile device 304 may compare its local trendline or trendlines to available global trendlines. Detection of an anomalous event may include detection that the local trendline has deviated substantially from its historical norm. For example, if the local trendline strays more than n standard deviations from the historical mean, this may be detected as an anomaly. This could also be time sensitive. A transitory spike in usage of a resource may not represent an actionable anomaly, but a large upward slope in a short time may represent an actionable anomaly. An anomaly could also be detected if both the local trendline and the global trendline deviate substantially from the historical mean. In yet another example, an anomaly could be detected if the difference between the local and global trendlines deviates substantially from a historical mean.

In some cases, cloud service 312 may also provide alerts to mobile device 304 via network 308. For example, if an operating system update is known to cause ill effects, then an alert may be provided to mobile device 304. Similarly, if a new malware object is detected, an alert may be provided. If there is a large deviation in the global trendline for a class, an alert may be provided to mobile devices of that class, even if the cause of the large deviation is not known. This can at least alert users and security administrators to a potential issue, and give them the opportunity to take appropriate action.

In some cases, mobile device 304 may be assigned to two or more classes. The class assignment could, on a basic level, include the device make and model, as well as the operating system and operating system version. It could also include other classes derived from a machine learning model.

For each class assigned to mobile device 304, the cloud service may also assign one or more operational parameters to track for that class. Device monitoring engine 216 may interact with device probes 220 to collect the classes of data requested. In addition to collecting information about the processor, memory, network, storage, battery usage, and other system resources, the foregoing may be used by way of nonlimiting example to provide an overall device "footprint." The device footprint may be tracked and shared with one or more classes. Furthermore, some classes may request monitoring of additional performance parameters, such as Wi-Fi signal strength, Bluetooth operation, application installations, or other telemetry data that may be of interest to that class.

For each assigned class, device monitoring engine 216 may maintain a local system profile. For example, device monitoring engine 216 may periodically collect telemetry data, such as every 3 to 5 minutes. Data points collected can be aggregated into a local trendline for mobile device 200. The term "trendline" used herein does not necessarily imply a visible line with plotted points and line segments connecting those plotted points. Although this is one possible representation of a trendline, a trendline could also include the raw data used to create such a graph, and any analytics that go into managing the data.

Figure 4:
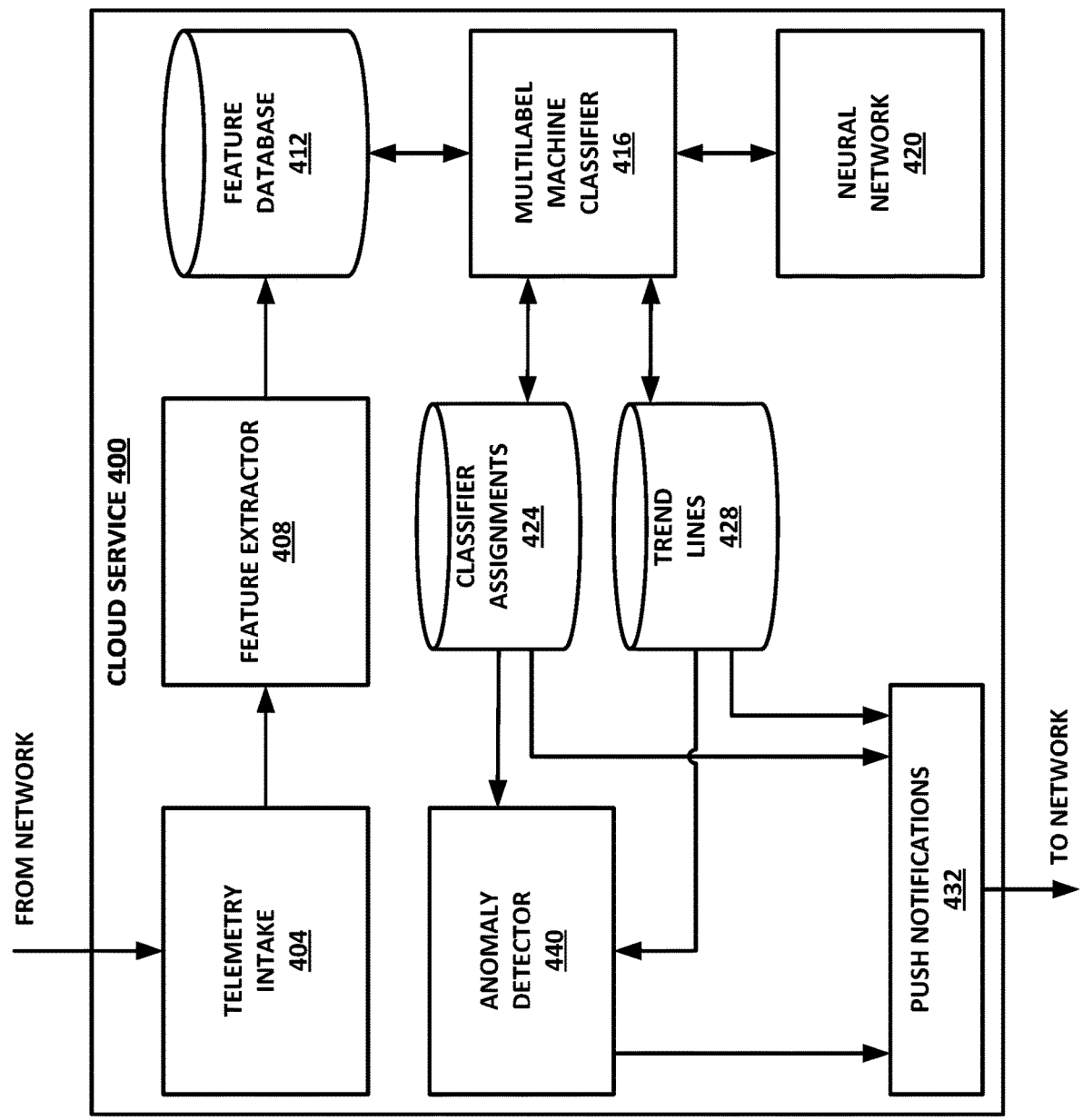
FIG. 4 is a block diagram of a cloud service.

FIG. 4 is a block diagram of a cloud service 400. Cloud service 400 may be hosted on a server, or within a cloud infrastructure, wherein certain aspects may be provided by one or more virtual machines, or via network function virtualization. Thus, it should be understood that while cloud service 400 is illustrated here as a single logical block, the functions of that logical block could be disaggregated in various components on a server rack, in different components on different server racks, or even in different data centers. Furthermore, even for a single virtual machine, the use of large-scale disaggregated computing (e.g., wherein a processor from one block is aggregated with memory from another block, storage from another block, and accelerators from another block) means that the physical representation of cloud service 400 may look very different from the logical block diagram illustration of FIG. 4.

In this example, a telemetry intake block 404 receives telemetry data from the network. This could include receiving telemetry from a large number of client devices that are collecting telemetry.

A feature extractor 408 may extract features of interest from the collected telemetry data. The extracted features can then be loaded into a feature database 412. Feature database 412 may include tagged or categorized data collected from the telemetry. These tagged or categorized data can be used by a machine learning model, such as a neural network.

In this illustration, a multi-label machine classifier 416 operates a neural network 420 to provide classification of data extracted from feature database 412. Multi-label machine classifier 416 may look for trends in data, and may be used to categorize different species of data. Advantageously, multi-label machine classifier 416 can identify categories that are self-learned, and that are different from the initial categories provided to it. For example, initial categories may include make and model, operating system, operating system version, or other easily recognizable categories or classes of devices. Neural network 420 may be trained on these initial categories, and may then mine data from feature database 412 to identify other useful categories that devices can be divided into.

The multi-label aspect of machine classifier 416 means that a single physical device can be assigned a plurality of labels. In other words, a single mobile device may be assigned to a number of different classes, and trendlines may be calculated on a class-wise basis for each class. Depending on the classes that a particular mobile device is assigned to, it may or may not share the same set of classes with other devices. For example, devices A, B, and C may be included in class 1, while devices B, C, and D are included in class 2, and devices A and D are provided in class 3. For each class, multi-label machine classifier 416 may identify one or more performance parameters relevant to that class and maintain global trendlines for each performance parameter, or alternatively, for an aggregate indicator built from a plurality of performance parameters.

The output of multi-label machine classifier 416 is a database of classifier assignments 424. Classifier assignments 424 may include the criteria for classification, devices assigned to that class, and performance parameters of interest to the class. Multi-label machine classifier 416 also creates trendlines 428, which may be created on a per-class and/or a per-performance indicator basis.

In some cases, cloud service 400 may include its own anomaly detector 440 that may detect anomalies on a class-wide or a global basis. This anomaly detection may be used to detect global events, such as an operating system update that breaks functionality, or a large virus outbreak.

Push notifications 432 may be pushed out to mobile devices with alerts, classifier updates, global trendlines, and other data that may be useful to the mobile devices.

Figure 5:
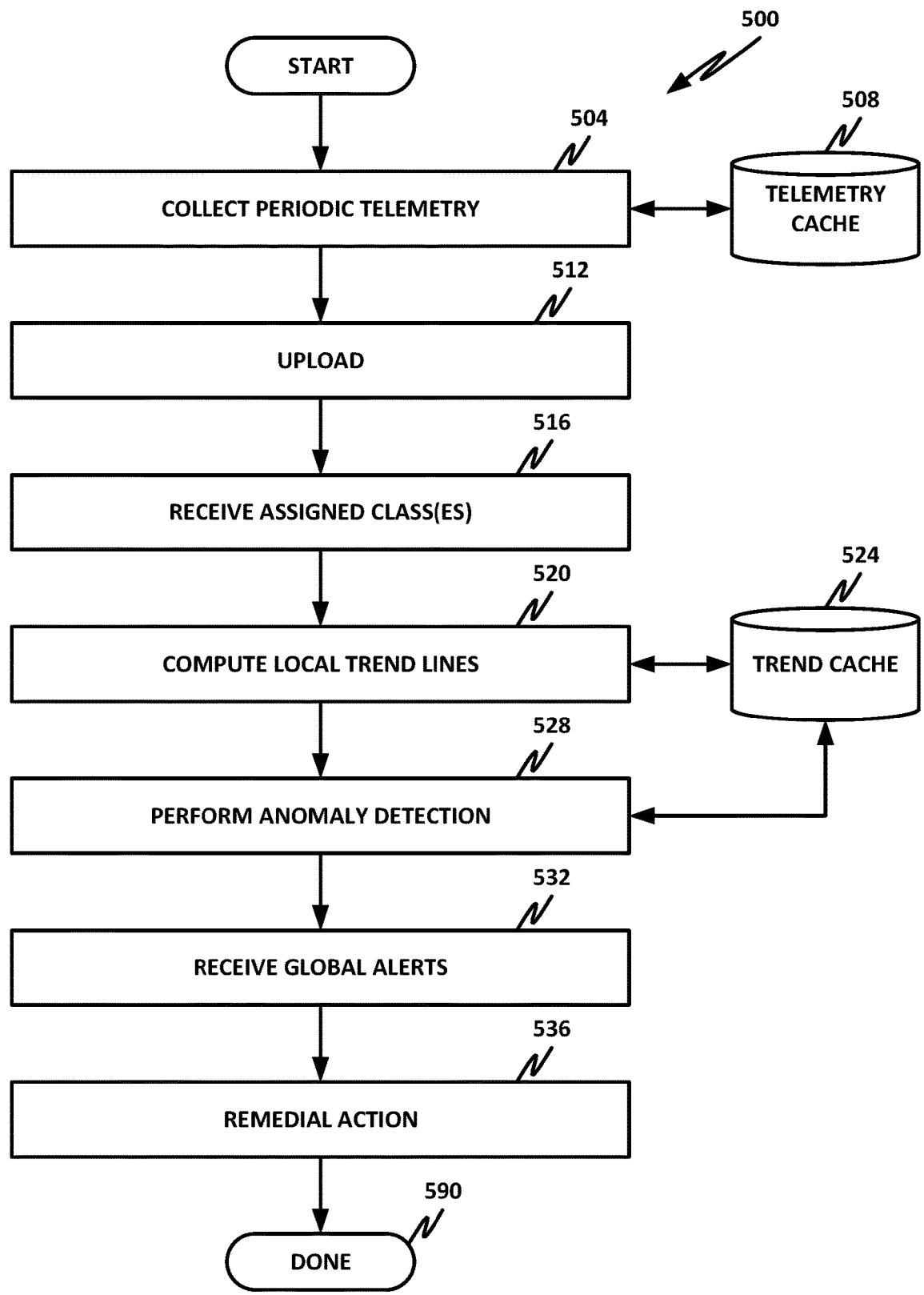
FIG. 5 is a flowchart of a method that may be performed, for example, by a mobile device.

FIG. 5 is a flowchart of a method 500 that may be performed, for example, by a mobile device.

Starting in block 504, the mobile device collects periodic telemetry, for example, via device probes. The periodic telemetry may be cached in a local telemetry cache 508. In some cases, local telemetry cache 508 may be provided on a sliding window. For example, keeping global telemetry for all time for the device may consume a large amount of storage and may have limited utility. Thus, a sliding window may be provided, wherein telemetry cache 508 includes the latest period of interest, such as the last two weeks, the last month, or the last three months, by way of illustrative and nonlimiting example.

In block 512, local telemetry data are uploaded to the cloud service.

In block 516, the mobile device receives from the cloud service one or more class assignments, which may include telemetry data to be collected for each class. As noted above, in some cases, different classes may include common telemetry values, and a number of classes may also use a standard device footprint that may include factors such as CPU, memory, storage, battery, network, or other key performance indicators.

In block 520, the mobile device computes a local trendline or lines for the collected telemetry. This may be stored in a trend cache 524.

In block 528, at appropriate times (such as periodically each day, or on some other stimulus), the mobile device may perform anomaly detection. This anomaly detection may include identifying local deviations in trendlines, either from the local trendline or from the global trendline.

In block 532, the mobile device may receive global alerts, which may be pushed out from the cloud service based on globally detected events.

In block 536, if a local or global anomaly is detected or alerted, then the mobile device may perform some remedial action. For example, the remedial action could include notifying a local user, notifying an enterprise security administrator, uninstalling a suspect application, sandboxing a suspect application, disabling a suspect application, rolling back an operating system update, rolling back an application update, or taking some other appropriate remedial action.

In block 590, the method is done.

Figure 6:
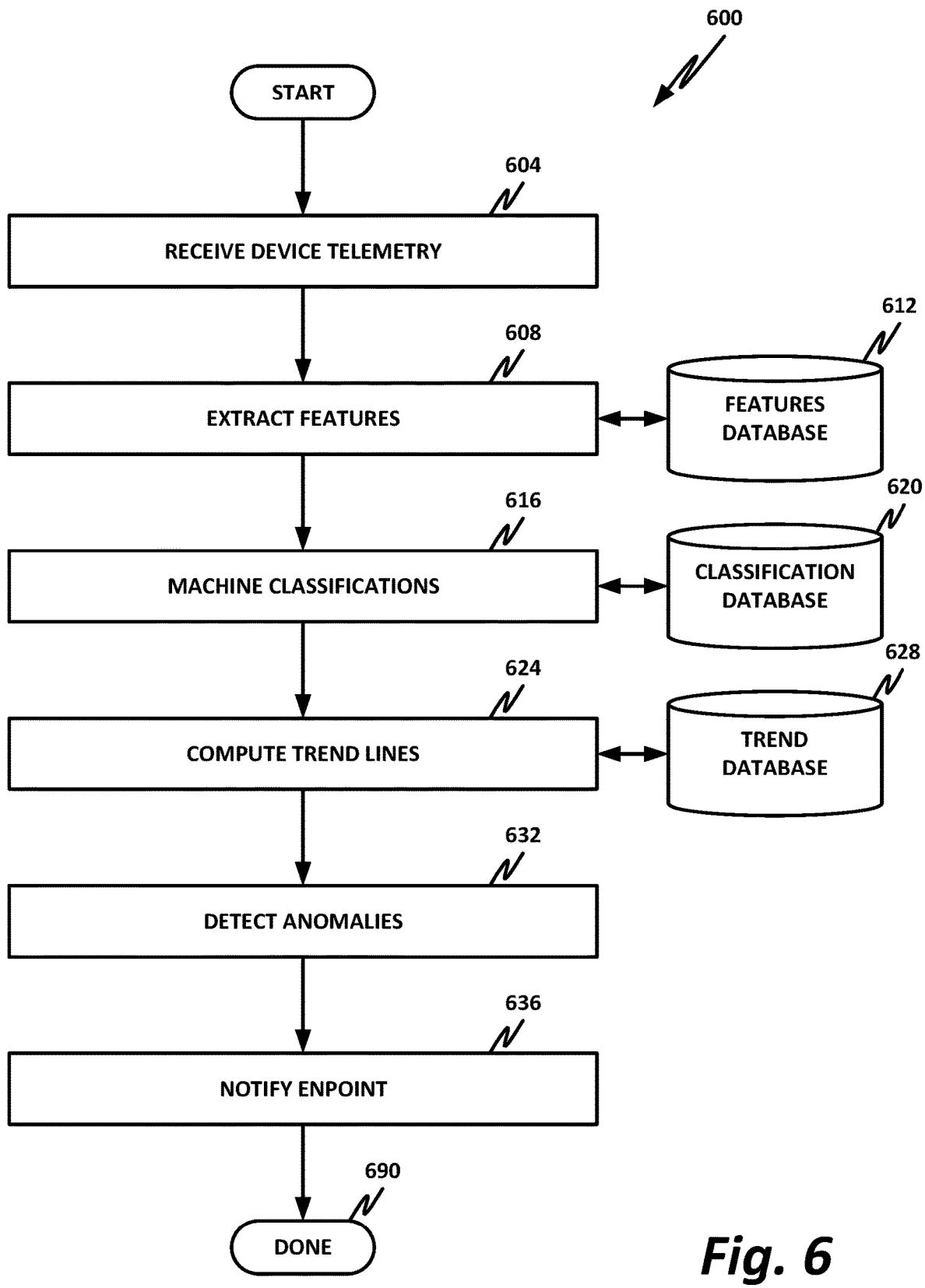
FIG. 6 is a flowchart of a method that may be performed by a cloud service.

FIG. 6 is a flowchart of a method 600 that may be performed by a cloud service.

Starting in block 604, the cloud service receives telemetry data from a plurality of endpoint devices. The number of endpoint devices providing telemetry data may be on the order of thousands or even millions of endpoint devices.

In block 608, the cloud service extracts features from the provided telemetry, and loads the features into a feature database 612.

In block 616, the device performs machine classification, such as via a neural network. Classifications can be provided to a class database 620. This can include both class assignments for individual devices, and types of telemetry to be collected for each class.

In block 624, the cloud service computes global trendlines for each class, and loads them into a trend database. The global trendlines may include individual trendlines for individual performance parameters collected for each class, and/or composite trendlines for an aggregate of multiple performance parameters collected for a class.

In block 632, the cloud service may optionally perform global anomaly detection.

In block 636, appropriate notifications may be provided to endpoints. These notifications could include class assignments, changes or updates to performance data or telemetry to be collected for each class, alerts for global events detected, or other information that may need to be provided to the endpoints.

In block 690, the method is done.

Figure 7:
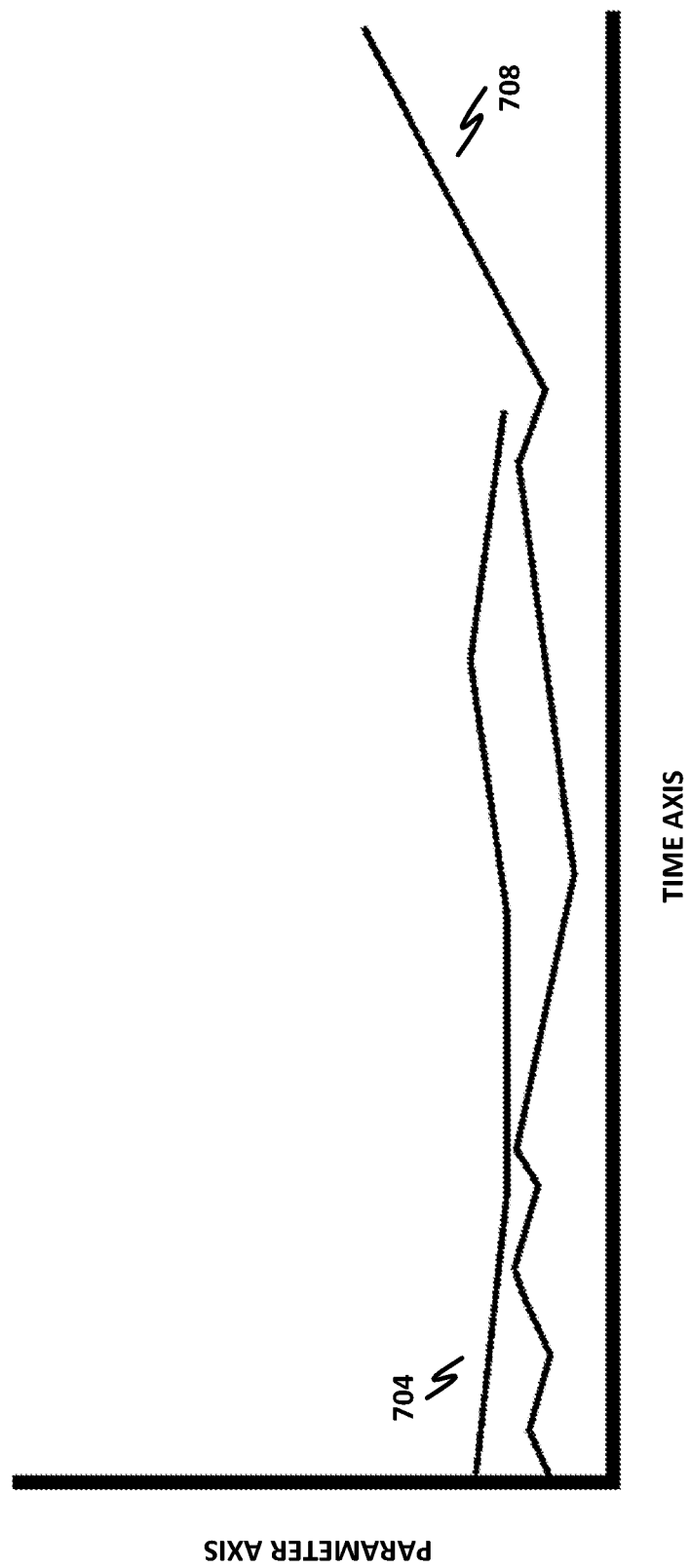
FIG. 7 is a graph illustrating trendlines.

FIG. 7 is a graph illustrating trendlines. In this example, both a global trendline 704 and a local trendline 708 are illustrated. These trendlines could be a trendline for an individual performance parameter (e.g., CPU usage), or they could represent an aggregate trendline compiled from a plurality of performance indicators, such as for a device footprint.

In this case, the local trendline 708 indicates, relative to global trendline 704, that this user's usage of the device is relatively light. However, near the end of the trendline, there is a large upward slope that takes the individual local trendline up well past the global trendline. This represents both an absolute deviation from the historical local trendline, and a substantial deviation from the local trendline as compared to the global trendline. Thus, this event may be detected as an anomaly.

Other, smaller variations in both the global and local trendline may not be detected as anomalies, because they do not deviate sufficiently from the mean trend over time.

As discussed above, a particular device classifier may include a number of performance parameters. Thus, individual trendlines could be kept for each performance indicator for that class. In other cases, a single aggregate trendline may be collected for the class.

In some cases, trendlines may be shared between classes. For example, in one illustrative example, a mobile device is assigned to six different classes. Five of these classes use common performance indicators, namely CPU usage, memory, storage, and network. Thus, the local trendline for each of those individual performance indicators may be shared between those five classes. However, each class may have its own global trendline for each performance indicator, because different devices may be assigned to the classes.

The sixth class may use a completely different trendline, such as Wi-Fi signal strength. In that case, there is no use in sharing that trendline with the other classes, and that parameter may be tracked only for that individual class.

FIG. 8 is a block diagram of a hardware platform 800. In at least some embodiments, hardware platform 800 may be configured or adapted to provide device anomaly detection, according to the teachings of the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 800, even though they may be scattered across a data center, or even located in different data centers.

Hardware platform 800 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 800 is arranged in a point-to-point (PtP) configuration. This PtP configuration is popular for personal computer (PC) and server-type devices, although it is not so limited, and any other bus type may be used.

Hardware platform 800 is an example of a platform that may be used to implement embodiments of the teachings of this specification. For example, instructions could be stored in storage 850. Instructions could also be transmitted to the hardware platform in an ethereal form, such as via a network interface, or retrieved from another source via any suitable interconnect. Once received (from any source), the instructions may be loaded into memory 804, and may then be executed by one or more processor 802 to provide elements such as an operating system 806, operational agents 808, or data 812.

Figure 10:
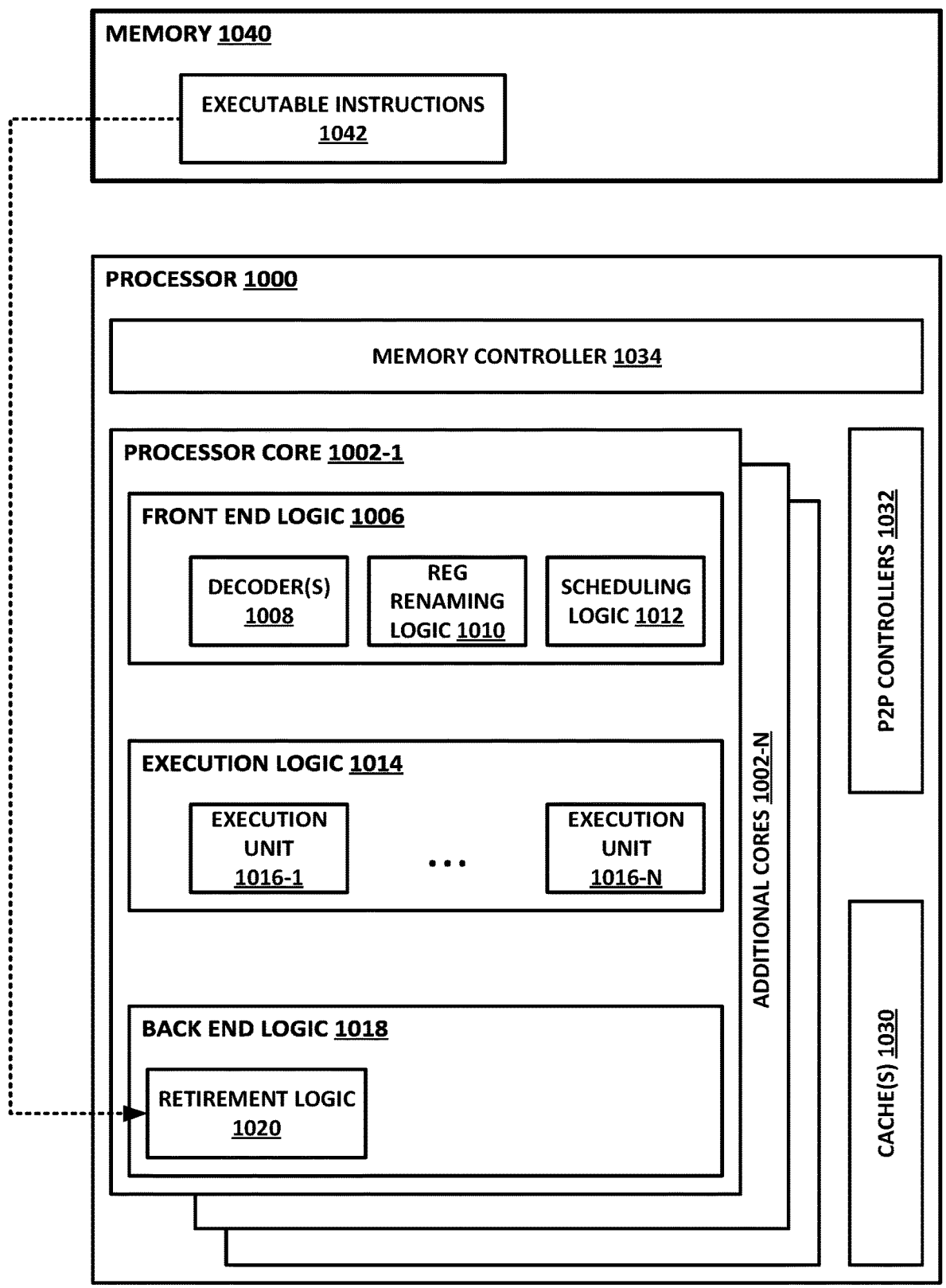
FIG. 10 is a block diagram illustrating selected elements of a processor.

Hardware platform 800 may include several processors 802. For simplicity and clarity, only processors PROC0 802-1 and PROC1 802-2 are shown. Additional processors (such as 2, 4, 8, 16, 24, 32, 64, or 128 processors) may be provided as necessary, while in other embodiments, only one processor may be provided. Details of processors 802 are not illustrated in this FIGURE, but one embodiment is illustrated in FIG. 10. Processors may have any number of cores, such as 1, 2, 4, 8, 16, 24, 32, 64, or 128 cores.

Processors 802 may be any type of processor and may communicatively couple to chipset 816 via, for example, PtP interfaces. Chipset 816 may also exchange data with other elements, such as a high performance graphics adapter 822. In alternative embodiments, any or all of the PtP links illustrated in FIG. 8 could be implemented as any type of bus, or other configuration rather than a PtP link. In various embodiments, chipset 816 may reside on the same die or package as a processor 802 or on one or more different dies or packages. Each chipset may support any suitable number of processors 802. A chipset 816 (which may be a chipset, uncore, Northbridge, Southbridge, or other suitable logic and circuitry) may also include one or more controllers to couple other components to one or more CPUs.

Two memories, 804-1 and 804-2 are shown, connected to PROC0 802-1 and PROC1 802-2, respectively. As an example, each processor is shown connected to its memory in a direct memory access (DMA) configuration, though other memory architectures are possible, including ones in which memory 804 communicates with processor 810 via a bus. For example, some memories may be connected via a system bus, or in a data center, memory may be accessible in a remote DMA (RDMA) configuration.

Memory 804 may include any form of volatile or non-volatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 804 may be used for short, medium, and/or long-term storage. Memory 804 may store any suitable data or information utilized by platform logic. In some embodiments, memory 804 may also comprise storage for instructions that may be executed by the cores of processors 802 or other processing elements (e.g., logic resident on chipsets 816) to provide functionality.

In certain embodiments, memory 804 may comprise a relatively low-latency volatile main memory, while storage 850 may comprise a relatively higher-latency non-volatile memory. However, memory 804 and storage 850 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 804 and storage 850, for example, in a single physical memory device, and in other cases, memory 804 and/or storage 850 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 822 may be configured to provide a human-readable visual output, such as a command-line interface (CLI) or graphical desktop such as Microsoft Windows, Apple OSX desktop, or a Unix/Linux X Window System-based desktop. Graphics adapter 822 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 822 may include a hardware graphics card, which may have its own memory and its own graphics processing unit (GPU).

Chipset 816 may be in communication with a bus 828 via an interface circuit. Bus 828 may have one or more devices that communicate over it, such as a bus bridge 832, I/O devices 835, accelerators 846, communication devices 840, and a keyboard and/or mouse 838, by way of nonlimiting example. In general terms, the elements of hardware platform 800 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 840 can broadly include any communication not covered by a network interface and the various I/O devices described herein. This may include, for example, various universal serial bus (USB), FireWire, Lightning, or other serial or parallel devices that provide communications.

I/O Devices 835 may be configured to interface with any auxiliary device that connects to hardware platform 800 but that is not necessarily a part of the core architecture of hardware platform 800. A peripheral may be operable to provide extended functionality to hardware platform 800, and may or may not be wholly dependent on hardware platform 800. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 842 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 832 may be in communication with other devices such as a keyboard/mouse 838 (or other input devices such as a touch screen, trackball, etc.), communication devices 840 (such as modems, network interface devices, peripheral interfaces such as PCI or PCIe, or other types of communication devices that may communicate through a network), audio I/O 842, a data storage device 844, and/or accelerators 846. In alternative embodiments, any portions of the bus architectures could be implemented with one or more PtP links.

Operating system 806 may be, for example, Microsoft Windows, Linux, UNIX, Mac OS X, iOS, MS-DOS, or an embedded or real-time operating system (including embedded or real-time flavors of the foregoing). In some embodiments, a hardware platform 800 may function as a host platform for one or more guest systems that invoke application (e.g., operational agents 808).

Operational agents 808 may include one or more computing engines that may include one or more non-transitory, computer readable mediums having stored thereon executable instructions operable to instruct a processor to provide operational functions. At an appropriate time, such as upon booting hardware platform 800 or upon a command from operating system 806 or a user or security administrator, processor 802 may retrieve a copy of the operational agent (or software portions thereof) from storage 850 and load it into memory 804. Processor 810 may then iteratively execute the instructions of operational agents 808 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 800 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 800 may be virtualized, in particular the processor(s) and memory. For example, a virtualized environment may run on OS 806, or OS 806 could be replaced with a hypervisor or virtual machine manager. In this configuration, a virtual machine running on hardware platform 800 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 8 may be combined in an SoC architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 9. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 9:
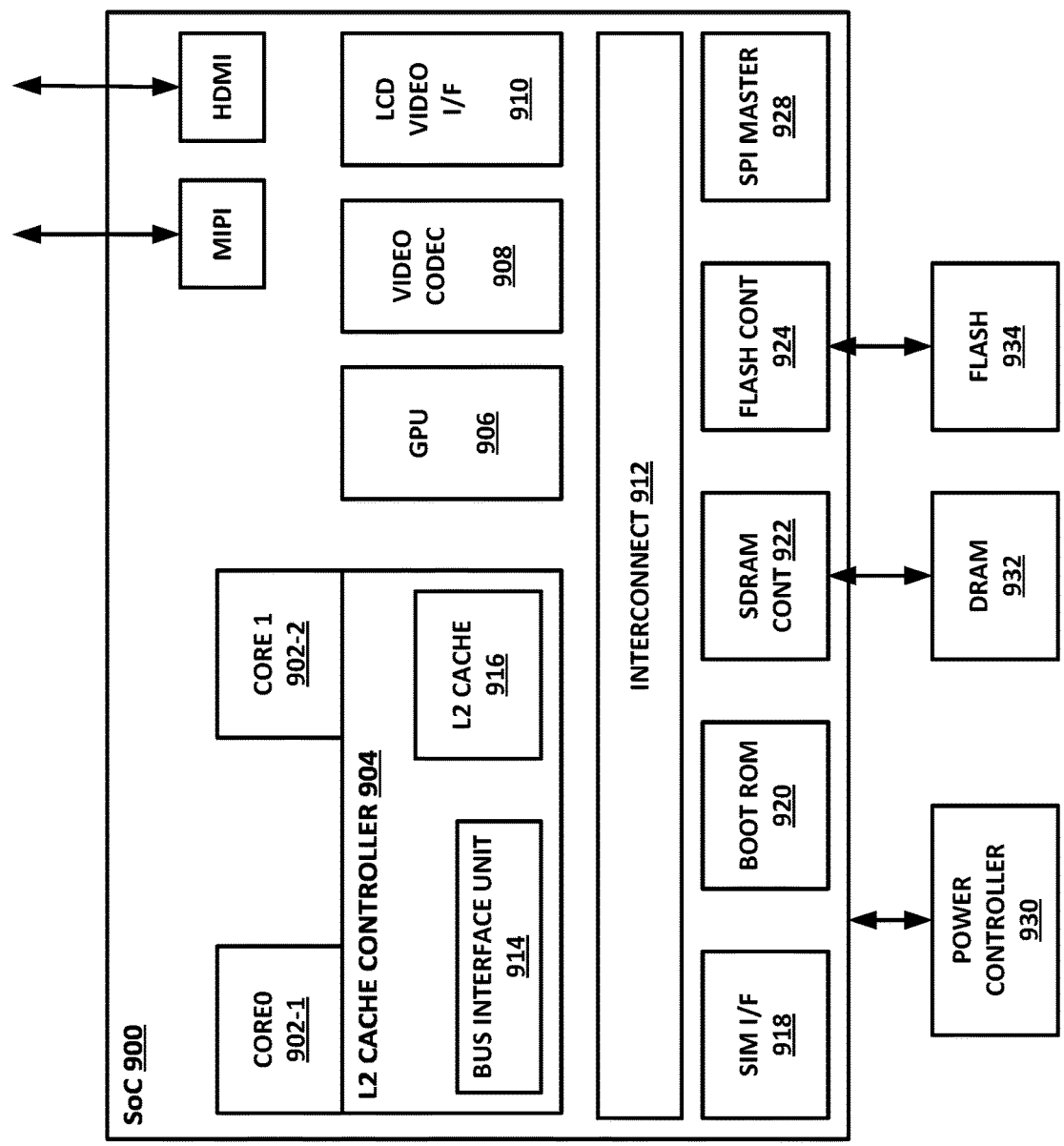
FIG. 9 is a block diagram illustrating selected elements of a system-on-a-chip (SoC).

FIG. 9 is a block illustrating selected elements of an example system-on-a-chip (SoC) 900. In at least some embodiments, SoC 900 may be configured or adapted to provide device anomaly detection, according to the teachings of the present specification.

At least some of the teachings of the present specification may be embodied on an SoC 900, or may be paired with an SoC 900. SoC 900 may include, or may be paired with, an advanced reduced instruction set computer machine (ARM) component. For example, SoC 900 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 900 could also be integrated into, for example, a PC, server, video processing components, laptop computer, notebook computer, netbook, or touch-enabled device.

As with hardware platform 800 above, SoC 900 may include multiple cores 902-1 and 902-2. In this illustrative example, SoC 900 also includes an L2 cache control 904, a GPU 906, a video codec 908, a liquid crystal display (LCD) I/F 910 and an interconnect 912. L2 cache control 904 can include a bus interface unit 914, a L2 cache 916. Liquid crystal display (LCD) I/F 910 may be associated with mobile industry processor interface (MIPI)/HDMI links that couple to an LCD.

SoC 900 may also include a subscriber identity module (SIM) I/F 918, a boot ROM 920, a synchronous dynamic random access memory (SDRAM) controller 922, a flash controller 924, a serial peripheral interface (SPI) master 928, a suitable power control 930, a dynamic RAM (DRAM) 932, and flash 934. In addition, one or more embodiments include one or more communication capabilities, interfaces, and features such as instances of Bluetooth™, a 3G modem, a global positioning system (GPS), and an 802.11 Wi-Fi.

Designers of integrated circuits such as SoC 900 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a non-volatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 10 is a block diagram illustrating selected elements of a processor 1000. In at least some embodiments, processor 1000 may be configured or adapted to provide device anomaly detection, according to the teachings of the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 1000 may include any number of processing elements, which may be symmetrical or asymmetrical.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 1000 includes one or more processor cores 1002, including core 1002-1-1002-N. Cores 1002 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 1000 may include at least one shared cache 1030, which may be treated logically as part of memory 1040. Memory 1040 may include executable instructions 1042, as illustrated. Caches 1030 may be filled according to known caching techniques, and may store instructions and/or data that may be used by one or more components of processor 1000.

Processor 1000 may include an integrated memory controller (MC) 1034, to communicate with memory 1040. Memory controller 1034 may include logic and circuitry to interface with memory 1040, and may also include a cache controller to handle filling and evicting instructions and data to and from cache 1030.

By way of example, each core 1002 may include front-end logic 1006, execution logic 1014, and backend logic 1018.

In the illustrated embodiment, front-end logic 1006 includes an instruction decoder or decoders 1008, register renaming logic 1010, and scheduling logic 1012. Decoder 1008 may decode instructions received. Register renaming logic 1010 may provide register renaming, for example to facilitate pipelining. Scheduling logic 1012 may schedule instruction execution, and may provide out-of-order (OOO) execution. Front-end logic 1006 may fetch incoming instructions, perform various processing (e.g., caching, decoding, branch predicting, etc.), and pass instructions to execution logic 1014.

Execution logic 1014 includes one or more execution units 1016-1-1016-N. Execution units 1016 may include hardware instructions and microcode to carry out the provided instructions.

Backend logic 1018 includes retirement logic 1020. Core 1002 may provide for speculative execution of instructions, branch prediction, and similar. Retirement logic 1020 may be configured to determine which predicted instructions were actually needed by the program flow.

Processor 1000 may also include a PtP controller 1032, which enables connection to an uncore, chipset, Northbridge, Southbridge, or bus, by way of example.

Figure 11:
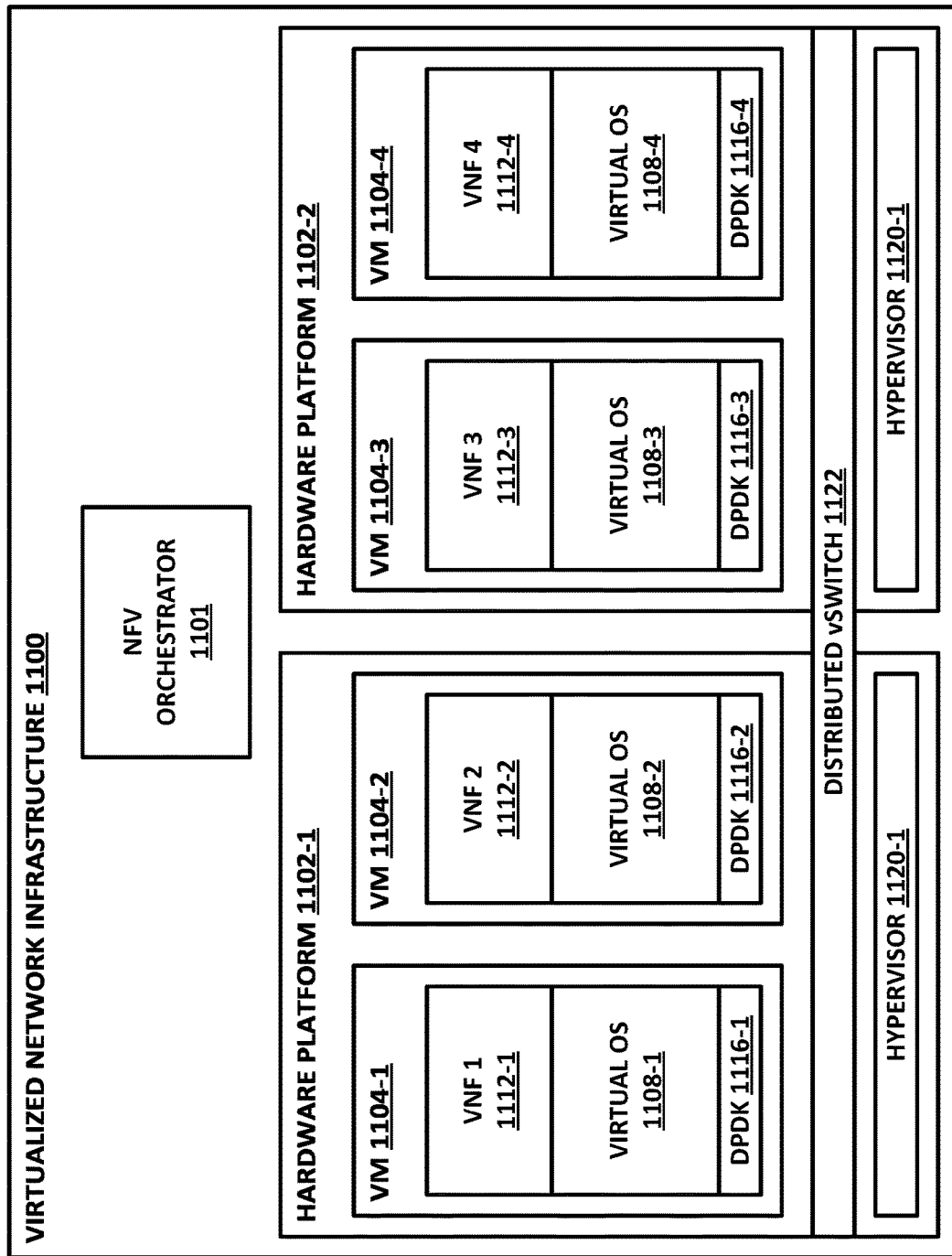
FIG. 11 is a block diagram illustrating selected elements of a network function virtualization (NFV) infrastructure.

FIG. 11 is a block diagram of a network function virtualization (NFV) infrastructure 1100. In at least some embodiments, NFV may be used to provide device anomaly detection, according to the teachings of the present specification.

NFV is an aspect of network virtualization that is generally considered distinct from, but that can still interoperate with, software defined networking (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1100. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 11, an NFV orchestrator 1101 manages a number of the VNFs 1112 running on an NFVI 1100. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1101 a valuable system resource. Note that NFV orchestrator 1101 may provide a browser-based or graphical configuration interface, and in some embodiments may be integrated with SDN orchestration functions.

Note that NFV orchestrator 1101 itself may be virtualized (rather than a special-purpose hardware appliance). NFV orchestrator 1101 may be integrated within an existing SDN system, wherein an operations support system (OSS) manages the SDN. This may interact with cloud resource management systems (e.g., OpenStack) to provide NFV orchestration. An NFVI 1100 may include the hardware, software, and other infrastructure to enable VNFs to run. This may include a hardware platform 1102 on which one or more VMs 1104 may run. For example, hardware platform 1102-1 in this example runs VMs 1104-1 and 1104-2. Hardware platform 1102-2 runs VMs 1104-3 and 1104-4. Each hardware platform may include a hypervisor 1120, virtual machine manager (VMM), or similar function, which may include and run on a native (bare metal) operating system, which may be minimal so as to consume very few resources.

Hardware platforms 1102 may be or comprise a rack or several racks of blade or slot servers (including, e.g., processors, memory, and storage), one or more data centers, other hardware resources distributed across one or more geographic locations, hardware switches, or network interfaces. An NFVI 1100 may also include the software architecture that enables hypervisors to run and be managed by NFV orchestrator 1101.

Running on NFVI 1100 are a number of VMs 1104, each of which in this example is a VNF providing a virtual service appliance. Each VM 1104 in this example includes an instance of the Data Plane Development Kit (DPDK), a virtual operating system 1108, and an application providing the VNF 1112.

Virtualized network functions could include, as nonlimiting and illustrative examples, firewalls, intrusion detection systems, load balancers, routers, session border controllers, DPI services, network address translation (NAT) modules, or call security association.

The illustration of FIG. 11 shows that a number of VNFs 1104 have been provisioned and exist within NFVI 1100. This FIGURE does not necessarily illustrate any relationship between the VNFs and the larger network, or the packet flows that NFVI 1100 may employ.

The illustrated DPDK instances 1116 provide a set of highly-optimized libraries for communicating across a virtual switch (vSwitch) 1122. Like VMs 1104, vSwitch 1122 is provisioned and allocated by a hypervisor 1120. The hypervisor uses a network interface to connect the hardware platform to the data center fabric (e.g., an HFI). This HFI may be shared by all VMs 1104 running on a hardware platform 1102. Thus, a vSwitch may be allocated to switch traffic between VMs 1104. The vSwitch may be a pure software vSwitch (e.g., a shared memory vSwitch), which may be optimized so that data are not moved between memory locations, but rather, the data may stay in one place, and pointers may be passed between VMs 1104 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1122 is illustrated, wherein vSwitch 1122 is shared between two or more physical hardware platforms 1102.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and an NVM. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory, computer readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory, computer readable storage media having stored thereon executable instructions that, when executed, cause a hardware platform or other computing system, to carry out a method or procedure. For example, the instructions could be executable object code, including software instructions executable by a processor. The one or more tangible, non-transitory, computer readable storage media could include, by way of illustrative and nonlimiting example, a magnetic media (e.g., hard drive), a flash memory, a ROM, optical media (e.g., CD, DVD, Blu-Ray), non-volatile RAM (NVRAM), NVM (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

EXAMPLE IMPLEMENTATIONS

The following examples are provided by way of illustration.

Example 1 includes a computing apparatus, comprising: a hardware platform comprising a processor and a memory; and an anomaly detection engine comprising instructions encoded within the memory to instruct the processor to: periodically collect telemetry for a performance parameter; compute and maintain a local trend line for the performance parameter; receive from a cloud service a global trend line for the performance parameter for a class of devices including the computing apparatus; and perform anomaly detection comprising analyzing the local trend line and the global trend line to detect an anomaly.

Example 2 includes the computing apparatus of example 1, wherein the computing apparatus is a mobile computing apparatus.

Example 3 includes the computing apparatus of example 1, wherein a period for collecting the telemetry is between two minutes and five minutes.

Example 4 includes the computing apparatus of example 1, wherein periodically collecting the telemetry comprises collecting telemetry for a plurality of performance parameters.

Example 5 includes the computing apparatus of example 4, wherein the plurality of performance parameters include processor utilization and memory usage.

Example 6 includes the computing apparatus of example 1, wherein the performance parameter includes battery utilization.

Example 7 includes the computing apparatus of example 1, wherein the performance parameter includes network utilization.

Example 8 includes the computing apparatus of example 1, wherein the instructions are further to receive a device class assignment from the cloud service, the device class assignment comprising an associated performance parameter to monitor.

Example 9 includes the computing apparatus of example 8, wherein the device class has a plurality of associated performance identifiers.

Example 10 includes the computing apparatus of example 1, wherein the instructions are further to receive from the cloud service a plurality of class assignments with associated performance parameters to monitor.

Example 11 includes the computing apparatus of example 1, wherein detecting the anomaly in the performance parameter comprises detecting a deviation from the local trend line.

Example 12 includes the computing apparatus of example 1, wherein detecting the anomaly in the performance parameter comprises detecting a deviation from the global trend line.

Example 13 includes the computing apparatus of example 1, wherein detecting the anomaly in the performance parameter comprises detecting a deviation in the local trend line relative to the global trend line.

Example 14 includes the computing apparatus of example 1, wherein the instructions are to periodically perform anomaly detection on an anomaly detection period different from a period for periodically collecting telemetry.

Example 15 includes the computing apparatus of example 14, wherein the anomaly detection period is approximately one day.

Example 16 includes the computing apparatus of example 1, wherein the instructions are further to infer a source event of a detected anomaly comprising correlating a time of the source event with a beginning of the detected anomaly.

Example 17 includes one or more tangible, non-transitory computer readable storage media having stored thereon executable instructions to instruct a processor to: receive from a cloud service a class assignment; periodically collect local telemetry of data relevant to the class assignment; compute a local trend from the local telemetry; receive a global trend, based on global data collected, from the cloud service; and perform anomaly detection based on detecting substantial deviations in the local trend or the global trend.

Example 18 includes the one or more tangible, non-transitory computer readable storage media of example 17, wherein a period for collecting the local telemetry is between two minutes and five minutes.

Example 19 includes the one or more tangible, non-transitory computer readable storage media of example 17, wherein periodically collecting the local telemetry comprises collecting telemetry for a plurality of performance parameters.

Example 20 includes the one or more tangible, non-transitory computer readable storage media of example 19, wherein the plurality of performance parameters comprises processor utilization and memory usage.

Example 21 includes the one or more tangible, non-transitory computer readable storage media of example 17, wherein the local telemetry comprises battery utilization.

Example 22 includes the one or more tangible, non-transitory computer readable storage media of example 17, wherein the local telemetry comprises network utilization.

Example 23 includes the one or more tangible, non-transitory computer readable storage media of example 17, wherein the class assignment from the cloud service is a device class assignment, the device class assignment comprising an associated performance parameter to monitor.

Example 24 includes the computing apparatus of example 23, wherein the device class has a plurality of associated performance identifiers.

Example 25 includes the one or more tangible, non-transitory computer readable storage media of example 17, wherein the instructions are further to receive from the cloud service a plurality of class assignments with associated local telemetry to monitor.

Example 26 includes the one or more tangible, non-transitory computer readable storage media of example 17, wherein performing anomaly detection comprises detecting a deviation in the local trend relative to the global trend.

Example 27 includes the one or more tangible, non-transitory computer readable storage media of example 17, wherein the instructions are to periodically perform anomaly detection on an anomaly detection period different from a period for periodically collecting the local telemetry.

Example 28 includes the one or more tangible, non-transitory computer readable storage media of example 27, wherein the anomaly detection period is approximately one day.

Example 29 includes the one or more tangible, non-transitory computer readable storage media of example 17, wherein the instructions are further to infer a source event of a detected anomaly comprising correlating a time of the source event with a beginning of the detected anomaly.

Example 30 includes a computer-implemented method of detecting device anomalies, comprising: collecting local telemetry of performance indicators relevant to a class a device belongs to; computing a local trend line from the local telemetry; receiving from a cloud service a global trend line for the performance indicators; and monitoring for anomalies comprising watching for substantial deviations from a mean in the local trend line, the global trend line, or the local trend line relative to the global trend line.

Example 31 includes the method of example 30, wherein a period for collecting the local telemetry is between two minutes and five minutes.

Example 32 includes the method of example 30, wherein the performance indicators comprise processor utilization and memory usage.

Example 33 includes the method of example 30, wherein the performance indicators include battery utilization.

Example 34 includes the method of example 30, wherein the performance indicators comprises network utilization.

Example 35 includes the method of example 30, wherein receiving the global trend line for the performance indicators from the cloud service further comprises receiving an associated performance parameter to monitor.

Example 36 includes the method of example 35, wherein the device class has a plurality of associated performance identifiers.

Example 37 includes the method of example 30, wherein receiving the global trend line for the performance indicators from the cloud service further comprises receiving a plurality of class assignments with associated performance parameters to monitor.

Example 38 includes the method of example 30, further comprising periodically performing anomaly detection on an anomaly detection period different from a period for periodically collecting the local telemetry.

Example 39 includes the method of example 38, wherein the anomaly detection period is approximately one day.

Example 40 includes the method of example 30, further comprising inferring a source event of a detected anomaly comprising correlating a time of the source event with a beginning of the detected anomaly.

Example 41 includes an apparatus comprising means for performing the method of any of examples 30-40.

Example 42 includes the apparatus of example 41, wherein the means for performing the method comprise a processor and a memory.

Example 43 includes the apparatus of example 42, wherein the memory comprises machine-readable instructions that, when executed, cause the apparatus to perform the method of any of examples 30-40.

Example 44 includes the apparatus of any of examples 41-43, wherein the apparatus is a computing system.

Example 45 includes at least one computer readable medium comprising instructions that, when executed, implement a method or realize an apparatus as illustrated in any of examples 30-44.

Example 46 includes a cloud server, comprising: a hardware platform; a telemetry module to collect telemetry from a plurality of endpoint devices; a machine learning classifier to define classes according to the telemetry, associate one or more performance indicators with the classes, and assign individual endpoints to the classes; and an anomaly detector to compute global trend lines for the performance indicators on a class-wise basis.

Example 47 includes the cloud server of example 46, wherein the hardware platform is a disaggregated computing platform.

Example 48 includes the cloud server of example 46, wherein one or more logical functions are provided via virtualization.

Example 49 includes the cloud server of example 46, wherein the machine learning classifier comprises a neural network.

Example 50 includes the cloud server of example 46, wherein the machine learning classifier is a multi-label machine learning classifier.

Example 51 includes the cloud server of example 46, wherein computing the global trend lines comprises computing individual global trend lines for a plurality of performance indicators.

Example 52 includes the cloud server of example 46, wherein computing the global trend lines comprises computing an aggregate trend line from a plurality of related performance indicators.

Example 53 includes the cloud server of example 46, wherein computing the global trend lines comprises computing a performance footprint for devices in a class.

Example 54 includes the cloud server of example 53, wherein the performance footprint comprises processor and memory utilization.

Example 55 includes the cloud server of example 53, wherein the performance footprint comprises battery utilization.

Example 56 includes the cloud server of example 53, wherein the performance footprint comprises network utilization.

Example 57 includes the cloud server of example 46, wherein the anomaly detector is further to detect a substantial deviation from a mean in a global trend line, and identify the deviation as a detected anomaly.

Example 58 includes the cloud server of example 46, further comprising a notifier to periodically push global trend lines associated with a class to endpoints assigned to that class.

Example 59 includes the cloud server of example 46, further comprising a notifier to notify endpoints of class assignments.

Example 60 includes the cloud server of example 46, further comprising a notifier to notify endpoints assigned to a class of detected anomalies in a global trend line of that class.

Example 61 includes a method of providing global anomaly detection, comprising: collecting telemetry from a large set of endpoint devices; training a neural network to classify the endpoint devices according to features from the telemetry; assigning one or more classes to the endpoints; associating telemetry data with the one or more classes; computing global trend lines from the telemetry data on a per-class basis; and detecting anomalies in the trend lines.

Example 62 includes the method of example 61, wherein the neural network comprises a multi-label machine learning classifier.

Example 63 includes the method of example 61, wherein computing the global trend lines comprises computing individual global trend lines for a plurality of performance indicators.

Example 64 includes the method of example 61, wherein computing the global trend lines comprises computing an aggregate trend line from a plurality of related performance indicators.

Example 65 includes the method of example 61, wherein computing the global trend lines comprises computing a performance footprint for devices in a class.

Example 66 includes the method of example 65, wherein the performance footprint comprises processor and memory utilization.

Example 67 includes the method of example 65, wherein the performance footprint comprises battery utilization.

Example 68 includes the method of example 65, wherein the performance footprint comprises network utilization.

Example 69 includes the method of example 61, wherein detecting anomalies in the trend lines further comprises detecting a substantial deviation from a mean in a global trend line, and identifying the deviation as a detected anomaly.

Example 70 includes the method of example 61, further comprising periodically pushing global trend lines associated with a class to endpoints assigned to that class.

Example 71 includes the method of example 61, further comprising notifying endpoints of class assignments.

Example 72 includes the method of example 61, further comprising notifying endpoints assigned to a class of detected anomalies in a global trend line of that class.

Example 73 includes an apparatus comprising means for performing the method of any of examples 61-72.

Example 74 includes the apparatus of example 73, wherein the means for performing the method comprise a processor and a memory.

Example 75 includes the apparatus of example 74, wherein the memory comprises machine-readable instructions that, when executed, cause the apparatus to perform the method of any of examples 61-72.

Example 76 includes the apparatus of any of examples 73-75, wherein the apparatus is a computing system.

Example 77 includes at least one computer readable medium comprising instructions that, when executed, implement a method or realize an apparatus as illustrated in any of examples 61-76.

What is claimed is:

1. A computing apparatus, comprising:
a hardware platform comprising a processor circuit and a memory; and
an anomaly detection engine comprising instructions encoded within the memory to instruct the processor circuit to:
receive, from a cloud service, a plurality of machine learning-derived device classes that the computing apparatus belongs to, respective device use parameters specific to the device classes, and respective global trend lines for the device classes;
periodically collect local telemetry for the device use parameters, and compute device-specific class-specific historical trendlines, wherein the device-specific class-specific historical trendlines comprises a difference between local resource usage for a class, based on the local telemetry, and global resource usage for the class based on the global trend line for the class;
detect an anomaly comprising determining consumption of the device use parameters for a device-specific class-specific recent usage trend line, and determining that the device-specific class-specific recent usage trend line deviates substantially from the device-specific class-specific historical trend line for the class; and
based on detecting the anomaly, notify a user of the computing apparatus, or a security administrator, of the anomaly, including when the anomaly occurred and which resources experienced the anomaly.

2. The computing apparatus of claim 1, wherein the computing apparatus is a mobile computing apparatus.

3. The computing apparatus of claim 1, wherein a period for collecting the local telemetry is between two minutes and five minutes.

4. The computing apparatus of claim 1, wherein periodically collecting the local telemetry comprises collecting telemetry for a plurality of performance parameters.

5. The computing apparatus of claim 1, wherein performing anomaly detection comprises detecting a deviation in a local trend line relative to an associated global trend line.

6. The computing apparatus of claim 1, wherein the instructions are to periodically perform anomaly detection on an anomaly detection period of approximately one day.

7. The computing apparatus of claim 1, wherein the instructions are further to infer a source event of a detected anomaly comprising correlating a time of the source event with a beginning of the detected anomaly.

8. The computing apparatus of claim 1, wherein the device classes are a subset comprising fewer than all classes to which the computer apparatus could correctly be assigned.

9. The computing apparatus of claim 1, wherein the instructions are further to treat an application as malicious or misconfigured according to anomaly.

10. One or more tangible, non-transitory computer readable storage media having stored thereon executable instructions to instruct a processor to:
 receive, from a cloud service, a plurality of machine-learning based assigned classes for a host device, respective host device parameters for the assigned classes, and global trend lines for the assigned classes;
 periodically collect local telemetry relevant to the respective host device parameters;
 compute local device-specific class-specific historical trend lines for the assigned classes, wherein the local device-specific class-specific historical trend lines comprise a difference between local resource usage for a class, based on the local telemetry, and global resource usage for the class, based on the global trend line for the class;
 detect an anomaly, comprising determining that a recent usage trend line for a class under analysis deviates substantially from a device-specific class-specific historical trend line for the class under analysis; and
 based on detecting the anomaly, notify a user of the host device, or a security administrator, of the anomaly, including when the anomaly occurred and which host device parameters experienced the anomaly.

11. The one or more tangible, non-transitory computer readable storage media of claim 10, wherein periodically collecting the local telemetry comprises collecting telemetry for a plurality of performance parameters.

12. The one or more tangible, non-transitory computer readable storage media of claim 11, wherein the plurality of performance parameters comprises processor utilization and memory usage.

13. The one or more tangible, non-transitory computer readable storage media of claim 10, wherein the assigned classes are a subset comprising fewer than all device classes to which the host device could correctly be assigned.

14. The one or more tangible, non-transitory computer readable storage media of claim 10, wherein the executable instructions are further to treat an application as malicious or misconfigured according to anomaly.

15. A method of detecting latent malware behavior in a computing device, comprising:
 receiving an assignment of the computing device as belonging to one or more classes;
 receiving, from a cloud service, respective class-specific global trend lines for the one or more classes, wherein the class-specific global trend lines include data on global device usage of compute resources for the one or more classes;
 computing historical device-specific class-specific historical local trend lines for the one or more classes, wherein the local trend lines are based on local usage of the compute resources by the computing device and include a difference between local usage and global usage;
 computing a local recent short-term trend line for a class;
 detecting an anomaly based on detecting that the local recent short-term trend line deviates statistically significantly from its historical local trend line; and
 based on detecting the anomaly, notifying a user of the computing device, or a security administrator, of the anomaly, including a time of the anomaly and which device use parameters experienced the anomaly.

16. The method of claim 15, further comprising periodically updating the device-specific class-specific historical local trend line comprises updating at an interval between 5 and 10 minutes.

17. The method of claim 15, wherein local recent short-term trend line is computed less frequently than the historical device-specific class-specific historical local trend lines.

18. The method of claim 17, wherein the local recent short-term trend line is computed daily or at times of low resource usage.

19. The method of claim 15, wherein the one or more classes comprise a subset of fewer than all classes that a machine learning algorithm has determined the computing device could be assigned to.

20. The method of claim 15, further comprising receiving from the cloud service a list of k class assignments for the computing device, and selecting a subset of n most important classes for trend line tracking, wherein n<k, and wherein n<10.

* * * * *

UNITED STATES PATENT AND TRADEMARK OFFICE
CERTIFICATE OF CORRECTION

PATENT NO. : 11,876,815 B2
APPLICATION NO. : 16/809423
DATED : January 16, 2024
INVENTOR(S) : Davoud Maha et al.

Page 1 of 1

It is certified that error appears in the above-identified patent and that said Letters Patent is hereby corrected as shown below:

In the Claims

In Column 30, Claim 17, Line 39, delete "wherein" and insert -- wherein the --, therefor.

Signed and Sealed this
Eleventh Day of June, 2024

Katherine Kelly Vidal
Director of the United States Patent and Trademark Office